(12) United States Patent
Broadbent et al.

(10) Patent No.: US 12,509,175 B2
(45) Date of Patent: Dec. 30, 2025

(54) EXTERNAL POCKET FOR LUGGAGE PACK

(71) Applicant: Tailfin Limited, Bristol (GB)

(72) Inventors: Nicholas Broadbent, Long Ashton (GB); Robert Phillips, Bristol (GB); Olivia Cowley, Axbridge (GB)

(73) Assignee: TAILFIN LIMITED, Bristol (GB)

( * ) Notice: Subject to any disclaimer, the term of this patent is extended or adjusted under 35 U.S.C. 154(b) by 0 days.

(21) Appl. No.: 18/673,706

(22) Filed: May 24, 2024

(65) Prior Publication Data

US 2024/0391548 A1    Nov. 28, 2024

(30) Foreign Application Priority Data

May 25, 2023 (GB) .................................... 2307882

(51) Int. Cl.
| | | |
|---|---|---|
| *B62J 9/21* | (2020.01) | |
| *B62J 9/20* | (2020.01) | |
| *B62J 9/23* | (2020.01) | |
| *B62J 9/26* | (2020.01) | |

(52) U.S. Cl.
CPC . *B62J 9/21* (2020.02); *B62J 9/20* (2020.02); *B62J 9/23* (2020.02); *B62J 9/26* (2020.02)

(58) Field of Classification Search
CPC ......... B62J 9/21; B62J 9/20; B62J 9/23; B62J 9/26; A45C 5/06
See application file for complete search history.

(56) References Cited

U.S. PATENT DOCUMENTS

| | | | | |
|---|---|---|---|---|
| 470,878 | A | * | 3/1892 | Mease ........................ B62J 9/21 |
| | | | | 224/463 |
| 1,841,154 | A | * | 1/1932 | Rath ........................ A45C 3/00 |
| | | | | 190/902 |
| 2003/0218035 | A1 | | 11/2003 | Willows et al. |
| 2008/0277978 | A1 | * | 11/2008 | Swogger .................... B62J 9/26 |
| | | | | 297/188.07 |
| 2020/0037733 | A1 | | 2/2020 | Lee |

OTHER PUBLICATIONS

UK Search Report dated Nov. 22, 2023 in co-pending GB Application No. GB2307882.7.
"Australian and NZ bikepacking gear recommended by you", B The Desire Lines CC Community, Undated, See "Framework Designs Custom Panniers", Archived Copy dated May 12, 2021, https://desirelinescc.com.au/journal/australian-nz-bikepacking-gear/, Accessed Nov. 21, 2023.

* cited by examiner

*Primary Examiner* — Khaled Annis
(74) *Attorney, Agent, or Firm* — Perilla Knox & Hildebrandt LLP

(57) ABSTRACT

A luggage pack in the form of a bar bag for attachment to a bicycle comprises an external stretch pocket made of a mesh with elastane or similar stretchy material, and a T-shaped Thermoplastic Polyurethane (TPU) component sewn into the leading edge of the pocket. The TPU component forms a strap, equipped with holes like a belt, for closure. A buckle is attached to the bag and supported by an internal structure of the bag. The strap is looped through the buckle and a prong on the buckle engages one of the strap's holes for secure closure. The design maintains bag stability, reduces flapping of the strap end, and provides easy, one-handed access to the bag.

14 Claims, 4 Drawing Sheets

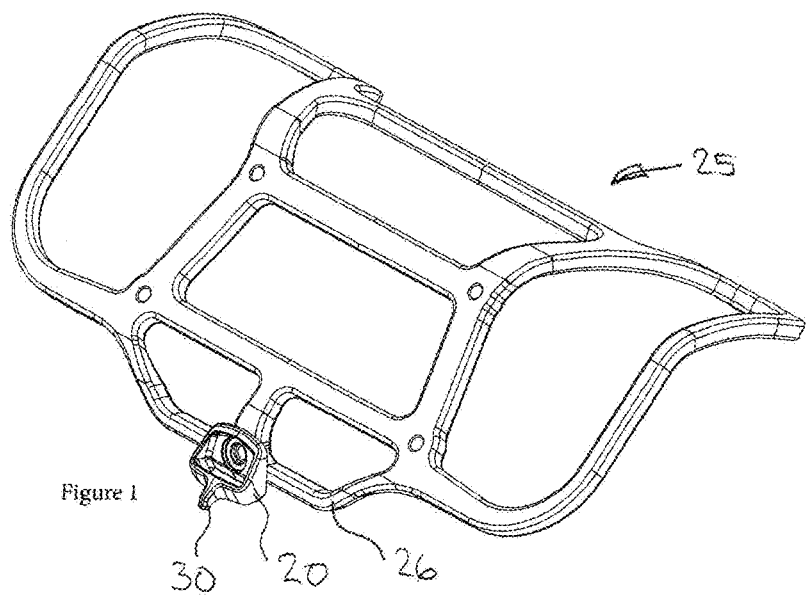
Figure 1
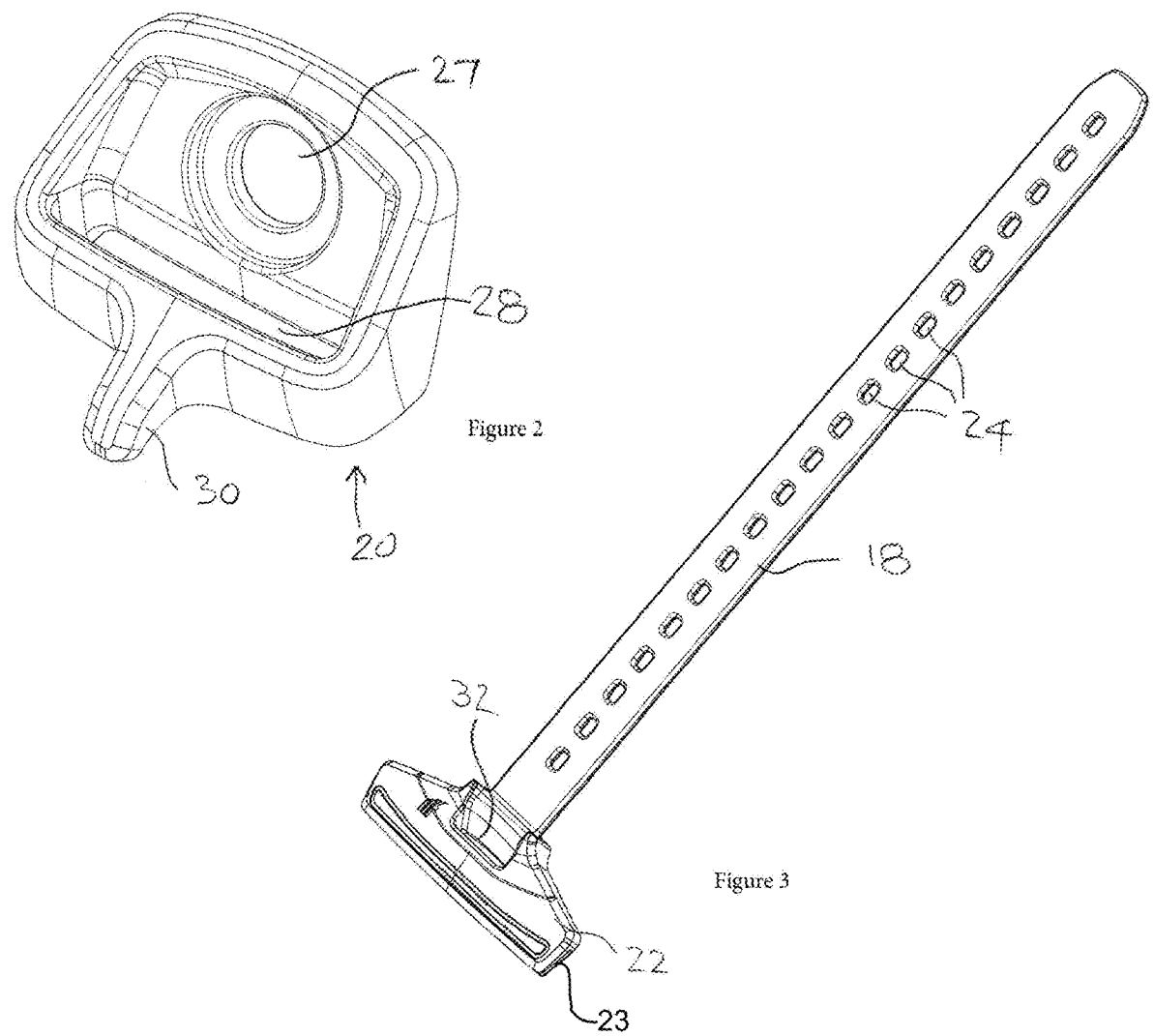
Figure 2
Figure 3

EXTERNAL POCKET FOR LUGGAGE PACK

FIELD OF THE INVENTION

This invention related to a luggage pack and is particularly although not exclusively concerned with a pack in the form of a bar bag for attachment to a bicycle handlebar.

BACKGROUND

Cycling accessories, and specifically bicycle handlebar bags, provide cyclists with a convenient way to carry items during a ride. However, traditional designs have limitations. Accessory pockets attached to these bags have a variety of closure mechanisms, such as zippers and roll tops, and often require two hands to open and close due to their design. Furthermore, their fixed volume makes them unsuitable for storing items that vary in size and may need to be accessed quickly, such as a wet jacket or food items. Some backpacks have stretchy stash pockets, or expandable pockets, but they typically include side release clips and ladder locks that are cumbersome and take up valuable space. Additionally, the usual nylon or polyester webbing used in these designs tends to clog with mud in environments such as the front of a bicycle, causing these mechanisms to become difficult to operate.

SUMMARY

According to the present invention there is provided an external pocket on a luggage pack, the pocket comprising a panel of flexible material which is secured to a body of the pack and which has an edge free of the body to provide an access opening for the pocket, the free edge being provided with an elongate reinforcing portion which is secured to the panel at the free edge and extends in the lengthwise direction of the free edge, the pocket having a closure mechanism comprising a buckle provided on the body and a strap attached to the reinforcing portion, whereby the strap is engageable with the buckle to close the pocket.

The strap may project from a location between the ends of the reinforcing portion. The strap may extend perpendicular to the reinforcing portion. The strap and the reinforcing portion may be formed integrally with each other.

A slot may be provided at the junction of the reinforcing portion and the strap to accommodate the free end of the strap. The slot may be positioned outwardly of the free edge of the panel.

The body may be provided with an internal stiffening structure, in which case the buckle may be attached to the internal structure.

The strap may be provided with a series of holes along its length, and the buckle may have a fixed prong which is engageable by a selected one of the holes. The strap may be made from a resiliently extendable material, such as thermoplastic polyurethane (TPU).

The external pocket may be formed from a panel of a stretchable material, such as an elastane containing mesh material.

The present invention also provides a bag provided with an external pocket in accordance with any one of the preceding claims.

BRIEF DESCRIPTION OF THE DRAWING FIGURES

For a better understanding of the present invention and to show more clearly how it may be carried into effect, reference will now be made, by way of example, to the accompanying drawings, in which:

FIG. 1 shows a reinforcement structure, provided with a buckle, for a luggage pack;

FIG. 2 is an enlarged view of the buckle;

FIG. 3 shows a strap provided with a reinforcing portion;

Figure 4:
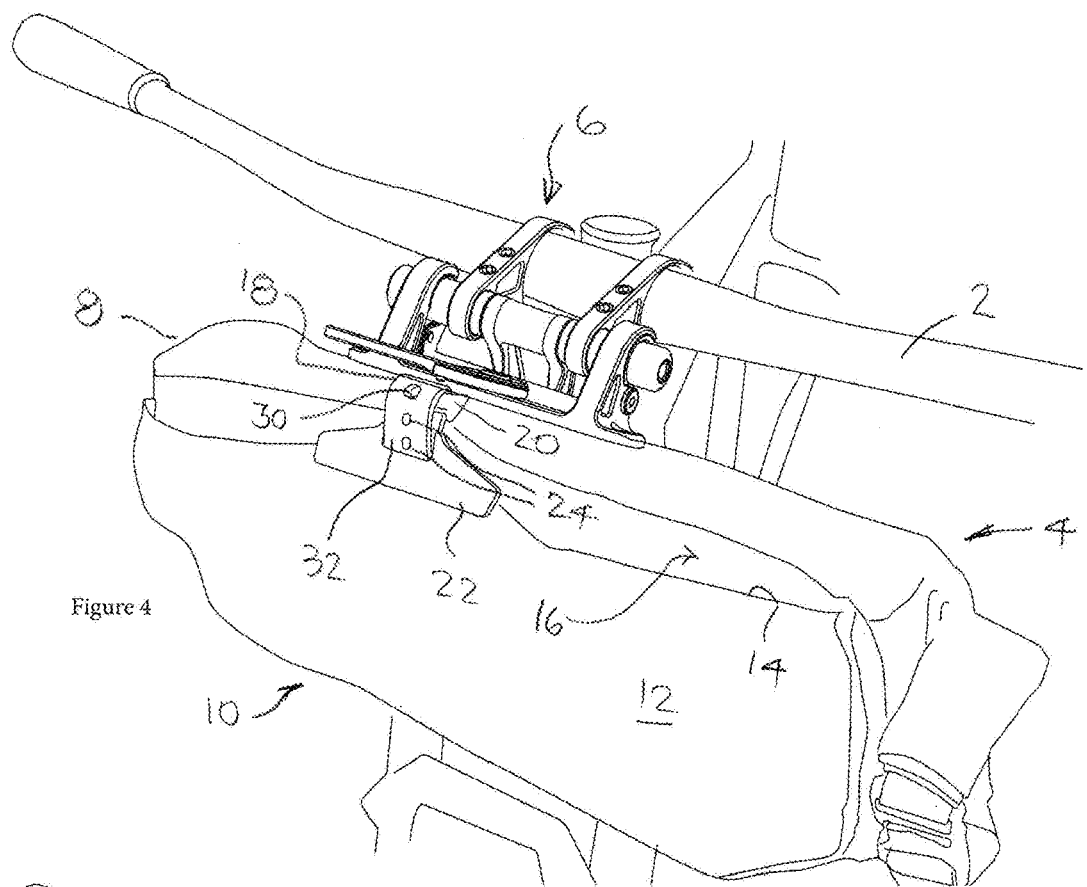
FIG. 4 shows a handlebar-mounted bag provided with an external pocket, with the pocket in the closed condition.
Figure 5:
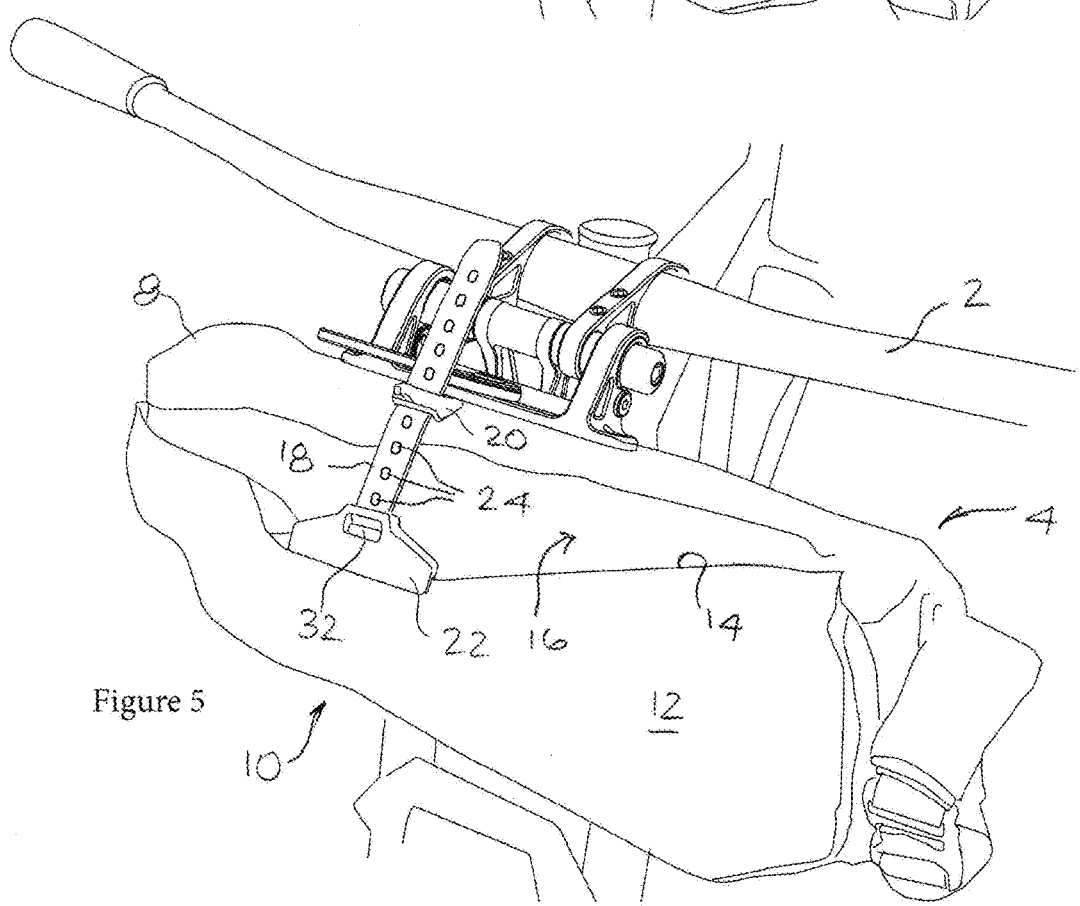
Figure 6:
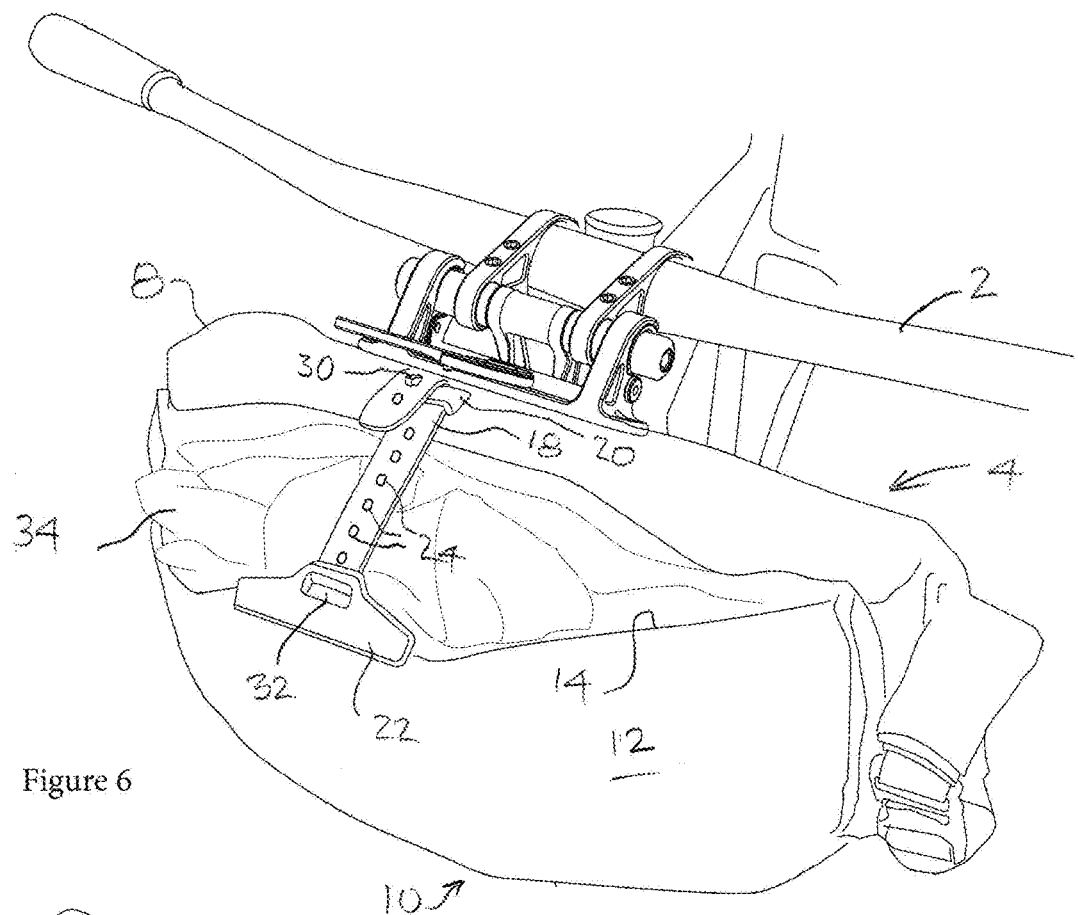
Figure 7:
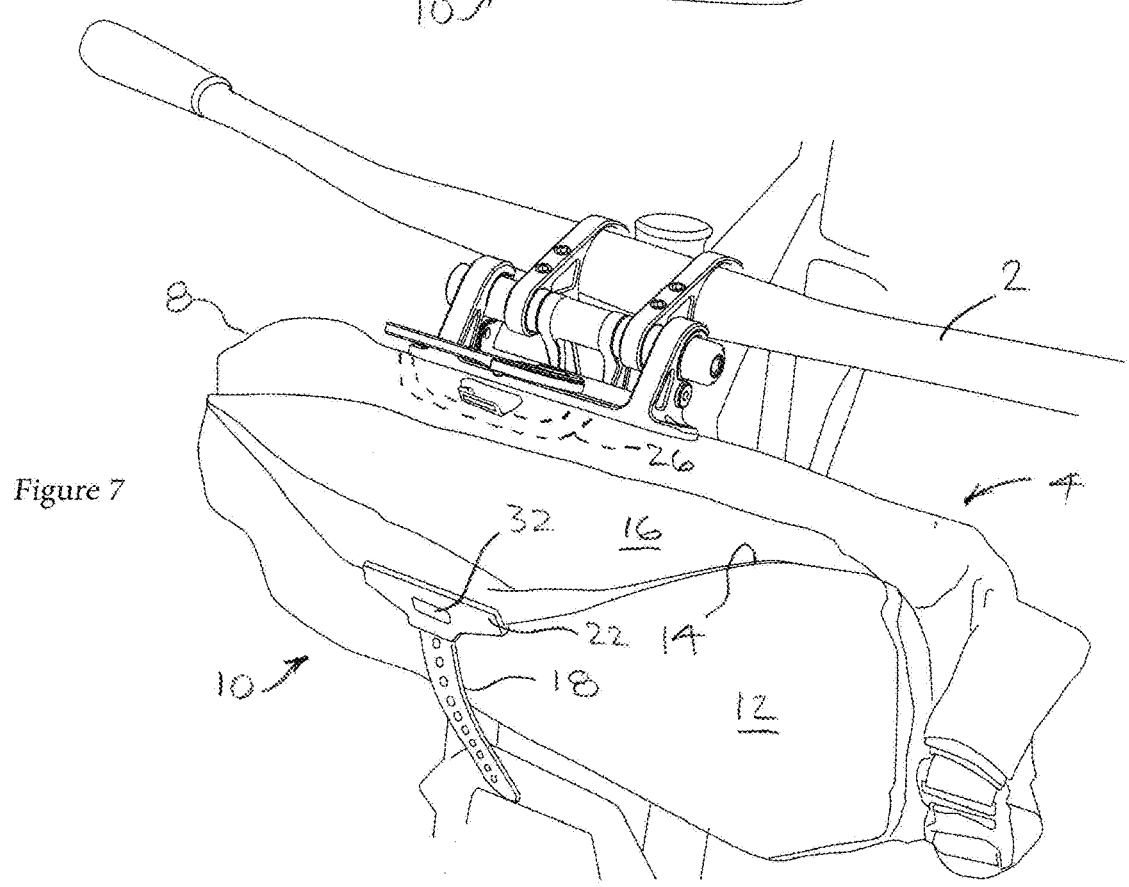

FIG. 5 corresponds to FIG. 4 but shows the pocket in a partially open condition;

FIG. 6 shows the pocket occupied by a jacket;

FIG. 7 shows the pocket in a fully open condition; and

Figure 8:
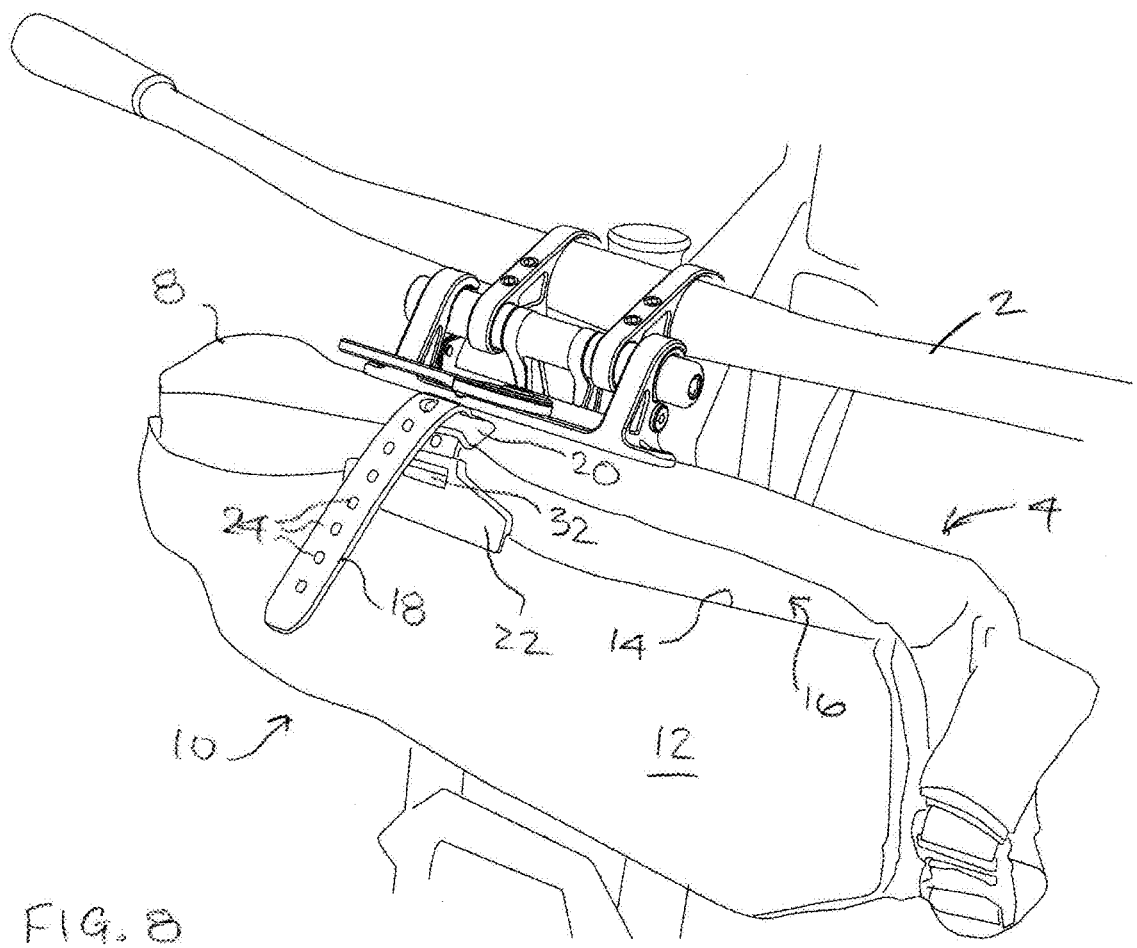

FIG. 8 shows the pocket in an almost closed condition;

DETAILED DESCRIPTION

The present invention provides a uniquely designed bag closure mechanism primarily aimed at enhancing the functionality of bar bags attached to bicycles.

The main component or body of the bag is made of a durable fabric. In one embodiment, the fabric is a Nylon variant with a Thermoplastic Polyurethane (TPU) coating that is welded together. The bag's distinctive feature is an external stretch pocket, in the form of a panel sewn or otherwise affixed to the main body. The stretch pocket can be made from any stretchy material. In one embodiment, the pocket panel is a mesh with elastane.

A T-shaped TPU component is sewn into the leading edge of the stretch pocket. The TPU is selected for its resilient nature, with an elongation at break percentage in the hundreds, making it stretchy or elastic. The TPU strap extends outward from the pocket and is designed with a series of holes akin to a belt, enabling it to be used for closure. The T-shaped TPU component includes a slot in the union of the T, designed to receive the loose end of the strap, thereby reducing flapping of the strap end.

In one unique feature of the invention, the T-shaped TPU component includes a groove running lengthwise along the top of the T. This groove captures the edge of the pocket on both sides before being sewn in, acting like a gripper. This design provides a more robust connection between the stretch pocket and the TPU component.

A buckle, made from a material such as Nylon or Aluminum alloy, is attached to the top of the bag. It is secured to an internal structure within the bag, preferably made from Aluminum alloy 6061-T6 or a similar material. The attachment to the internal structure is facilitated by a screw that passes through a hole in the buckle, sandwiching the bag skin between the buckle and the internal structure, creating a watertight seal. This internal structure provides support to the buckle, enhancing the stability of the bag.

The buckle is designed with a prong protruding from its top. The TPU strap loops around the buckle in a U-turn fashion, and the prong on the buckle engages with the holes in the strap. The engagement of the prong with the strap's holes secures the closure of the stretch pocket.

In summary, this invention provides a bag with an enhanced closure mechanism for its stretch pocket. The design not only improves bag stability but also reduces flapping of the strap end and provides easy, one-handed access to the bag. The invention represents a significant functional improvement over previous bag designs and offers durability for prolonged use.

FIG. 4 shows handlebars 2 of a bicycle, to which a luggage pack or bag 4 is mounted by a mechanism 6. Any suitable mechanism may be employed, but one possibility is that disclosed in our co-pending patent application GB2211838.4, to which reference is directed. The mechanism 6 provides easy adjustment of the position of the bag 4 relative to the handlebars 2, simple attachment and release of the bag 4.

The bag 4 comprises a bag body 8 made from a flexible sheet material which may be a durable fabric. On the side of the body 8 directed away from the handlebars 2 there is a pocket 10 formed from a panel 12 of a stretchable material such as an elastane-containing mesh fabric. The panel 12 is secured along three edges, namely the lower edge, and each side edge, to the material of the body 8, for example by stitching, bonding or welding. The remaining edge 14, which is the upper edge as shown in FIG. 4, is free of the material of the body 8, and so provides an opening 16 giving access to the interior of the pocket 10.

In the condition shown in FIG. 4, the pocket 10 is closed by means of a strap 18 and a buckle 20. The buckle 20 is secured to the body 8 of the bag 4, while the strap 18 is secured to the upper edge 14 of the panel 12 at a reinforcement portion 22. The strap 18 and the reinforcement portion 22 are formed integrally with each other from a resiliently stretchable material, such as thermoplastic polyurethane (TPU).

The free edge 14 is formed by folding over and stitching the raw edge of the panel 12 to form a hem, and the reinforcement portion 22 is formed with a groove 23 in its lower edge (as viewed in FIG. 4) which receives the hem. The hem is secured to the free edge 14 by any suitable means, such as stitching, bonding or welding. The reinforcement portion 22 thus spreads any load applied through the strap 18 along a portion of the overall length of the free edge 14. It will be appreciated that the reinforcement portion 22 is elongate and extends in the lengthwise direction of the free edge 14.

As shown more clearly in FIG. 3, the strap 18/reinforcement portion 22 unit is generally T-shaped. The strap is provided with a series of holes 24.

FIG. 7 shows the pocket 10 in the open condition so that the access opening 16 is widely open to enable items to be placed into, or taken out of, the pocket 10. The strap 18 hangs downwardly. FIG. 7 shows, in dashed outline, a stiffening component 26 situated within the body 8 to give it a defined form, even when empty. An example of a suitable stiffening component 26 is shown in FIG. 1 and may, for example, be made from a suitably rigid plastics material such as nylon, or from a metallic material such as an aluminium alloy. The buckle 20 is secured to the body 8 by a fastener, such as a screw extending through a hole 27, which engages the stiffening component 26 to ensure a reliable connection.

As shown in FIG. 3, the buckle 20 is provided with an aperture 28 and a fixed prong 30. As shown in FIG. 5, the strap 18 can be passed through the aperture 28 and drawn upwardly (as viewed in FIG. 5) to draw the panel 12 into the closed condition, reducing the size of the access opening 16. During this process, the strap 18 is placed under tension, and so stretches somewhat. When the pocket 10 is closed as far as possible (allowing for the bulk of any contents), the strap 18 can be folded back down towards the reinforcing portion 22, as shown in FIG. 8, and, with the strap 18 still under tension, the prong 30 can be engaged with an appropriate one of the holes 24. This retains the strap 18 locked against the buckle 22, to hold any contents in place, and to keep the access opening 16 closed as far as possible.

FIG. 3 shows a slot 32 situated generally at the junction between the strap 18 and the reinforcing portion 22. As shown in FIG. 4, the free end of the strap 18 can be directed into the slot 32 to be accommodated behind the panel 12, i.e. within the interior of the pocket 10. This avoids unsightly projection of the free end of the strap 18 from the bag, and avoids catching of the strap 18 on any external objects.

FIG. 6 shows the pocket 10 accommodating an article of clothing 34, such as a jacket. The bulk of the jacket 34 prevents the pocket 10 from being fully closed, but nevertheless the strap 18 can engage the buckle 20 by passing through the slot 32. The strap 18 can then be turned back and engaged with the prong 30 in an appropriate one of the holes 24. In this condition, the strap 18 is maintained under tension, to keep the pocket 10 secure and with the jacket 34 compressed to some extent.

For the avoidance of doubt, the present application extends to the subject-matter described in the following numbered Statements:

Statement 1. An external pocket on a luggage pack, the pocket comprising a panel of flexible material which is secured to a body of the pack and which has an edge free of the body to provide an access opening for the pocket, the pocket having a closure mechanism comprising a strap and a buckle provided one on the panel and one on the body whereby the strap is engageable with the buckle to close the pocket.

Statement 2. An external pocket as in Statement1, in which the strap is provided on the panel and the buckle is provided on the body.

Statement 3. An external pocket as in Statement2, in which the strap is attached to an elongate reinforcing portion which is secured to the panel at the free edge and extends in the lengthwise direction of the free edge.

Statement 4. An external pocket as in Statement4, in which the strap projects from a location between the ends of the reinforcing portion.

Statement 5. An external pocket as in Statement3 or 4, in which the strap extends perpendicular to the reinforcing portion.

Statement 6. An external pocket as in any one of Statements 3 to 5, in which the strap and the reinforcing portion are formed integrally with each other.

Statement 7. An external pocket as in any one of Statements 3 to 6, in which a slot is provided at the junction of the reinforcing portion and the strap to accommodate the free end of the strap.

Statement 8. An external pocket as in Statement7, in which the slot is positioned outwardly of the free edge of the panel.

Statement 9. An external pocket as in any one of Statements 2 to 8, in which the body is provided with an internal stiffening structure.

Statement 10. An external pocket as in Statement9, in which the buckle is attached to the internal structure.

Statement 11. An external pocket as in any one of the preceding Statements, in which the strap is provided with a series of holes along its length.

Statement 12. An external pocket as in Statement11, in which the buckle has a fixed prong which is engageable by a selected one of the holes.

Statement 13. An external pocket as in any one of the preceding Statements, in which the strap is made from a resiliently extendable material.

Statement 14. An external pocket as in Statement13, in which the strap is made from thermoplastic polyurethane (TPU).

Statement 15. An external pocket as in any one of the preceding Statements, in which the panel is made from a stretchy fabric.

Statement 16. A bag comprising an external stretch pocket, wherein said pocket is closed by a T-shaped TPU component sewn into its leading edge.

Statement 17. The bag of Statement 16, wherein the T-shaped TPU component forms a strap that extends outward from the pocket, said strap being designed with a series of holes.

Statement 18. The bag of Statement 17, wherein the T-shaped TPU component includes a slot in the union of the T, wherein the slot is designed to receive the loose end of the strap.

Statement 19. The bag of Statement 16, wherein a buckle is attached to the top of the bag, supported by an internal structure to which it is screwed.

Statement 20. The bag of Statement 19, wherein the buckle is made of Nylon or similar material, and includes a prong that protrudes from its top.

Statement 21. The bag of Statement 16 or 17, wherein the strap loops around the buckle, with the prong of the buckle engaging with the holes in the strap to secure the closure.

Statement 22. The bag of Statement 19, wherein the internal structure is made from an Aluminum alloy 6061-T6 or similar material.

Statement 23. The bag of Statement 16, wherein the stretch pocket is made from a mesh with elastane or similar stretchy material.

Statement 24. The bag of Statement 16, wherein the T-shaped TPU component has a groove running lengthwise along the top of the T, capturing the edge of the pocket on both sides before being sewn in, acting like a gripper.

Statement 25. The bag of Statement 16, wherein the main body of the bag is made of a durable fabric, specifically a Nylon fabric with a TPU coating that is welded together.

The invention claimed is:

1. An external pocket on a luggage pack configured for attachment to a bicycle, the pocket comprising a panel of flexible material which is secured to a body of the pack and which has an edge free of the body to provide an access opening for the pocket, the free edge being provided with an elongate reinforcing portion which is secured to the panel at the free edge and extends in the lengthwise direction of the free edge, the pocket having a closure mechanism comprising a buckle provided on the body and a strap attached to the reinforcing portion, whereby the strap is engageable with the buckle to close the pocket, wherein the strap projects from a location between ends of the reinforcing portion.

2. An external pocket as claimed in claim 1, in which the strap extends perpendicular to the reinforcing portion.

3. An external pocket as claimed in claim 1, in which the strap and the reinforcing portion are formed integrally with each other.

4. An external pocket as claimed in claim 1, in which a slot is provided at the junction of the reinforcing portion and the strap to accommodate a free end of the strap.

5. An external pocket as claimed in claim 4, in which the slot is positioned outwardly of the free edge of the panel.

6. An external pocket as claimed in claim 1, in which the body is provided with an internal stiffening structure.

7. An external pocket as claimed in claim 6, in which the buckle is attached to the internal structure.

8. An external pocket as claimed in claim 1, in which the strap is provided with a series of holes along its length.

9. An external pocket as claimed in claim 8, in which the buckle has a fixed prong which is engageable by a selected one of the holes.

10. An external pocket as claimed in claim 1, in which the strap is made from a resiliently extendable material.

11. An external pocket as claimed in claim 10, in which the strap is made from thermoplastic polyurethane (TPU).

12. An external pocket as claimed in claim 1, which is formed from a panel of a stretchable material.

13. An external pocket as claimed in claim 12, in which the material is an elastane containing mesh material.

14. A bag provided with an external pocket in accordance with claim 1.

* * * * *